United States Patent Office 3,137,531
Patented June 16, 1964

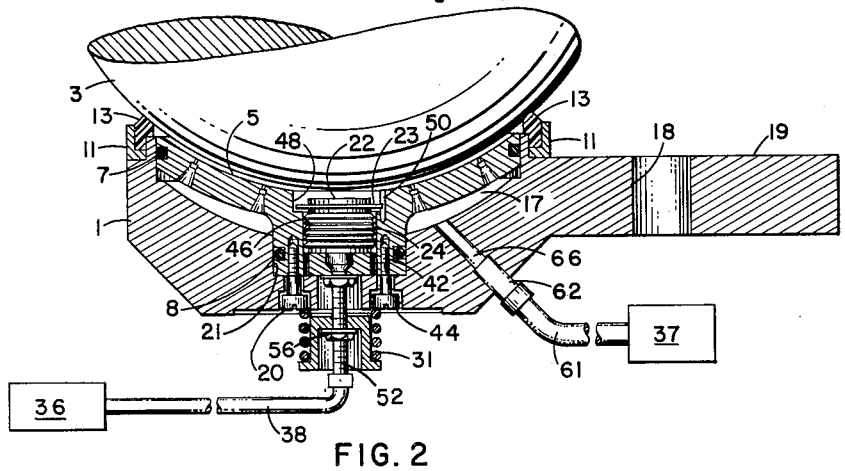
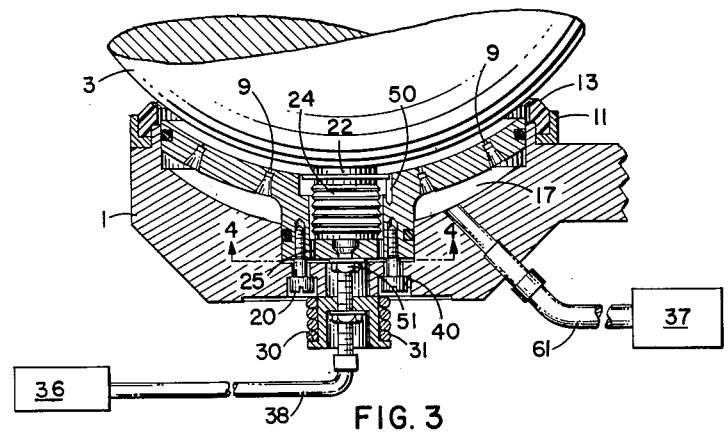
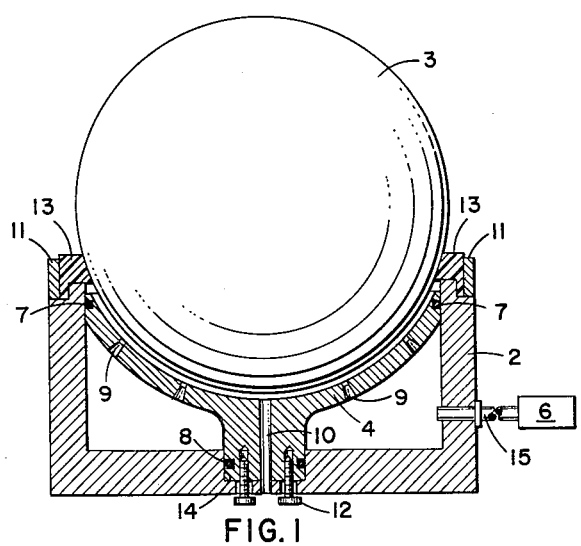
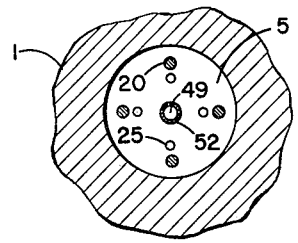
FIG. 4
Adolf L. Herrmann
Rudolf E. Beyer
Herbert K. Naumann,
INVENTORS.

3,137,531
GASEOUS BEARING
Adolf L. Herrmann and Rudolf E. Beyer, Huntsville, Ala., and Herbert K. Naumann, New York, N.Y., assignors to the United States of America as represented by the Secretary of the Army
Filed Aug. 14, 1961, Ser. No. 185,171
8 Claims. (Cl. 308—9)
(Granted under Title 35, U.S. Code (1952), sec. 266)

The invention described herein may be manufactured and used by or for the Government for governmental purposes without the payment of any royalty thereon.

This invention relates generally to gaseous bearings, and more particularly to a gaseous bearing of the ball and cup type.

This bearing will be described with reference to air as a gas medium; it being understood that other gaseous media such as nitrogen may be used.

The bearing described herein is designed for use in the support of loads where minimum friction is desired. It is of particular use in a space vehicle motion simulator for supporting the vehicle while it pivots about the spherical bearing. The angular freedom of motion of the spherical air bearing is ±120 degrees in the pitch and roll axis and unlimited freedom in the yaw axis. This freedom of movement is made possible by using a support arm which can be moved out of the way during operation of the simulator.

Various types of air bearings have been used in the prior art, but they have not been entirely satisfactory in their operation. One type of a conventional air bearing employs a cup having a flange at its outer periphery which bolts to a support housing. One apparent disadvantage of this type of bearing is that if it is subjected to large loads the high stresses which result can cause deflection and distortion of the cup, particularly since the bearing is supported from the side rather than from beneath the base. Another disadvantage of this type of bearing is the excessive metal-to-metal contact of the ball and cup which causes undue wear and galling and may also obstruct some of the small holes which admit air to the bearing surfaces.

It is therefore an object of this invention to provide an air bearing designed to avoid possible deflection and distortion from large loads by supporting the bearing cup at its base rather than its sides.

It is another object of this invention to provide an air bearing in which the support housing contains a vertically movable cup of a pedestal configuration.

An additional object of this invention is to provide an air bearing which substantially eliminates metallic contact between the ball and cup by employing a support ring for carrying the weight of the ball when the air pressure is turned off.

It is also an object of this invention to provide means for stopping the motion of the ball by use of an air actuated brake movably mounted within the bearing cup.

It is another object of this invention to provide greater stability in an air bearing by having an air outlet port at or near the center of the bearing cup.

According to the present invention, the foregoing and other objects are attained by providing an air bearing comprising a support ring attached to the upper periphery of a support housing. A cup which is slidably engaged with the inside of the housing raises the ball off the ring when the air pressure is on and, when the air pressure is off, a spring draws the cup downward allowing the ball to again rest on the ring. An air actuated brake pad is slidably engaged in the center of the cup for stopping the motion of the ball.

The nature of the invention will be more fully understood from the following detailed description and by reference to the accompanying drawings in which:

FIGURE 1 is an elevational cross-sectional view of one embodiment of the air bearing.

FIGURE 2 is a vertical cross-sectional view of a preferred embodiment of the air bearing with the air pressure off.

FIGURE 3 is a vertical cross-sectional view of the embodiment of FIGURE 2 with the main air supply and braking air supply on.

FIGURE 4 is a view taken along line 4—4 of FIGURE 3.

Referring to FIGURE 1 a movable support mass or sphere 3 is shown air supported by means of the air pressure issuing from a plurality of air holes 9 arranged in two concentric circles on the pedestal shaped cup 4. The air pressure is supplied from a compressed air source 6, through inlet port 15 and escapes from between the ball and cup at the periphery of the cup and also through outlet port 10. This central port 10 increases the stability of the bearing by eliminating the tendency toward self-sustained oscillations. The cup 4 is movably mounted within the support housing 2 by means of threaded studs 12 which are located at the base of the support housing 2. The base of the housing 2 has a recessed opening 14 in which the base of the cup 4 is seated. By adjusting the threaded studs 12 which thread into the base of cup 4 and slidably engage with openings in the base of the housing 2, the cup may be raised or lowered. In the absence of air pressure the cup 4 is lowered and the base will rest on a soft metal or plastic support ring 13 which is attached at the periphery of housing 2 by retaining member 11. O-rings 7 and 8 are provided to insure that compressed air from source 6 can escape only through the holes 9.

Refering to the preferred embodiment of FIGURE 2 the same sphere 3 is shown resting on a plastic or soft metal support ring 13 which is attached to the upper periphery of support housing 1 by an annular retaining member 11. The housing 1 is maintained in position through means (not shown) attached through the aperture 18 of support arm 19. Below the sphere 3 a movable air transmitting socket or cup 5 is shown in its lowered position. The cup is retained in this position by the action of spring 31 which acts against the bottom surface of support housing 1 and the inner flange of a bell shaped member 30. The cup is slidably engaged in the recess 21 of support housing 1 and is prevented from blowing out of the housing by four limits studs 20. The limit studs extend through openings 40 in the base of the support housing and are engaged in threaded openings 42 located at the base of the cup. A recess 44 in the base of the housing allows for limited movement of the stud relative to the housing 1. Besides the small air holes 9 the cup has a larger central opening 46 which houses a metallic bellows 24. A rubber brake pad 22 is secured to a plate 23 at the top of the bellows 24 and is housed in a recess 48 having a larger diameter than opening 46. The bellows and brake pad form an air actuated brake which is guided in a vertical plane by a dowel pin 50 which is located on the inner surface of recess 48 and passes through an opening in plate 23. The central opening 46 also serves as an air outlet port through small annular openings 25 (more clearly shown in FIGURE 4) when air pressure is supplied from a main air supply source 37, and increases the stability of the bearing by eliminating the tendency toward self-sustained oscillations. The main air supply source 37 is connected through a suitable air connecting line 61 to air port 62 which is threaded into opening 66 to allow air to enter chamber 17. A hollow shaft 52 which is secured to the base of bellows 24 and a flexible connecting line 38 provide communication from a secondary compressed air source 36 to the air actuated bellows 24. The shaft 52 also acts as a means to hold member 30 in place through the use of a washer and adjustable nut 56. A washer and nut 51 bear against the central section of the base of cup 5 which in turn is secured to the bottom surface of bellows 24.

The operation of the bearing mount is as follows: With the air pressure off the sphere 3 rests on the support ring 13. The cup 5 is pulled down out of contact with the sphere 3 by a spring 31 which need only be sufficiently strong to overcome the friction between O-rings 7 and 8 and the sides of housing 1 with which they contact. When the pressure is turned on the O-rings 7 and 8 insure that the air can escape only through the two concentric rings of small air holes 9 in cup 5 and annular openings 25. Since the air escapes through these small holes 9 and 25 slowly, a pressure differential exists above and below the cup 5 which causes it to move upward toward sphere 3 which is resting on support ring 13. As the cup 5 rises the volume between its upper surface and the sphere 3 decreases until the pressure has reached a point where the sphere will lift off the support ring and float on the air film between it and the upper concave surface of cup 5. The rise of cup 5 due to the pressure differential is, however, limited by the studs 20.

With the sphere 3 and its associated structure supported by the air film, it is often desirable to stop the motion of the sphere 3. For example, when the air bearing is used with a satellite motion simulator it may be desired to balance a test table supported by the sphere 3 and then release it without imparting an initial velocity to the sphere. This has been accomplished by incorporating an air actuated brake in the center of cup 5. When the brake is not actuated the brake pad 22 is not in contact with the sphere 3, but when, as shown in FIGURE 3, the air pressure from source 36 is applied through brake inlet port 49 the bellows 24 expand and force the brake pad against the sphere 3. The brake pad supports only a small portion of the weight of the sphere so that the operation of the air bearing is not impaired by the braking action. The brake pad is secured against rotation and lateral motion by dowel pin 50 and therefore brings the air supported mass to a complete stop. When the air pressure from source 36 is turned off the bellows contract, pulling the brake pad away from sphere 3 which is then free to rotate again.

FIGURE 4 is a section through 4—4 of FIGURE 2 to more clearly show the relationship between the housing 1 and the cup-shaped element 5 and the location of studs 20 with respect to openings 25. Hollow shaft 52 is shown in the center of the cup-shaped element.

Obviously numerous modifications and variations of the present invention are possible in the light of the above teachings. It is therefore to be understood that within the scope of the appended claims the invention may be practiced otherwise than as specifically described herein.

We claim:

1. A gaseous bearing comprising: a mass supporting member and a second member having a space therebetween, said second member being disposed to house a movable cup-shaped element in said space, said element having a plurality of holes therethrough, means for supplying pressurized gas through said holes to provide a gaseous film for support of said mass supporting member and to urge said element upward until said mass supporting member rests on said film of air and to prevent undesirable oscillations from being imparted to said mass supporting element.

2. A gaseous bearing according to claim 1 in which said mass supporting member has a spherically-shaped outer surface and is disposed for movement on said gaseous film.

3. A gaseous bearing according to claim 1 in which said second member is a cup-shaped housing having an annular support ring attached at its upper periphery for support of said mass supporting member at a distance from said cup-shaped element to prevent metal to metal contact between said mass supporting member and said cup-shaped element in the absence of said pressurized gas.

4. A gaseous bearing according to claim 1 in which said means comprises a central gaseous outlet port extending therethrough to provide greater stability for said first member.

5. A gaseous bearing according to claim 1 in which said element has a large central opening, a gaseous operated brake means housed in said central opening, said brake means adapted to stop the movement of said first member when it is supported by said pressurized gas film.

6. A gaseous bearing according to claim 1 wherein a plurality of limit studs extend partially through the base of said second member and are secured to the base of said element to provide limited movement of said element with respect to said second member.

7. A gaseous bearing according to claim 6 in which said second member is a cup-shaped housing, resilient means disposed adjacent to said housing for providing a biasing force for movement of said element.

8. A gaseous bearing comprising two substantially concentric interfitting members having a clearance therebetween, the first member being a movable mass supporting element and the second member being a cup having a plurality of holes therethrough; means for supplying gas under pressure through said holes into said clearance to provide a supporting film of gas for said first member; said cup being slidably engaged inside a cylindrically shaped housing having an annular supporting ring attached at its upper periphery, means for connecting the bases of said housing and said cup comprising a plurality of limit studs, the base of said housing and said cup having a central opening and a plurality of smaller openings located on the circumference of a circle concentric to said central opening, said studs extending through the smaller openings in the base of said housing for threaded engagement with the smaller openings in the base of said cup to provide for limited movement of the cup with respect to the housing; a cylindrically shaped member having an outwardly extending annular flange at one end and a base with a central opening at the other end; a hollow shaft having a first end extending through the central opening in the base of said cylindrically shaped member and attached thereto and the second end extending through the central opening in the base of said housing and attached to the inside of the central opening of the base of said cup; a spring acting on the inner surface of said flange and the base of said housing to provide automatic means, in the absence of fluid pressure, for lowering the cup within the housing; a rubber brake pad affixed to the upper surface of a metallic bellows and housed in the central opening of said cup, the second end of said shaft being in communication with the lower surface of said bellows, means connected to said shaft providing a source of pressure to actuate the bellows so that the brake pad makes contact with and stops the movement of said first member when it is supported by a gaseous film.

References Cited in the file of this patent

UNITED STATES PATENTS

| | | |
|---|---|---|
| 2,695,198 | Brugger | Nov. 23, 1954 |
| 2,951,729 | Skarstrom | Sept. 6, 1960 |

FOREIGN PATENTS

| | | |
|---|---|---|
| 138,761 | Great Britain | Feb. 19, 1920 |